Figure 1:
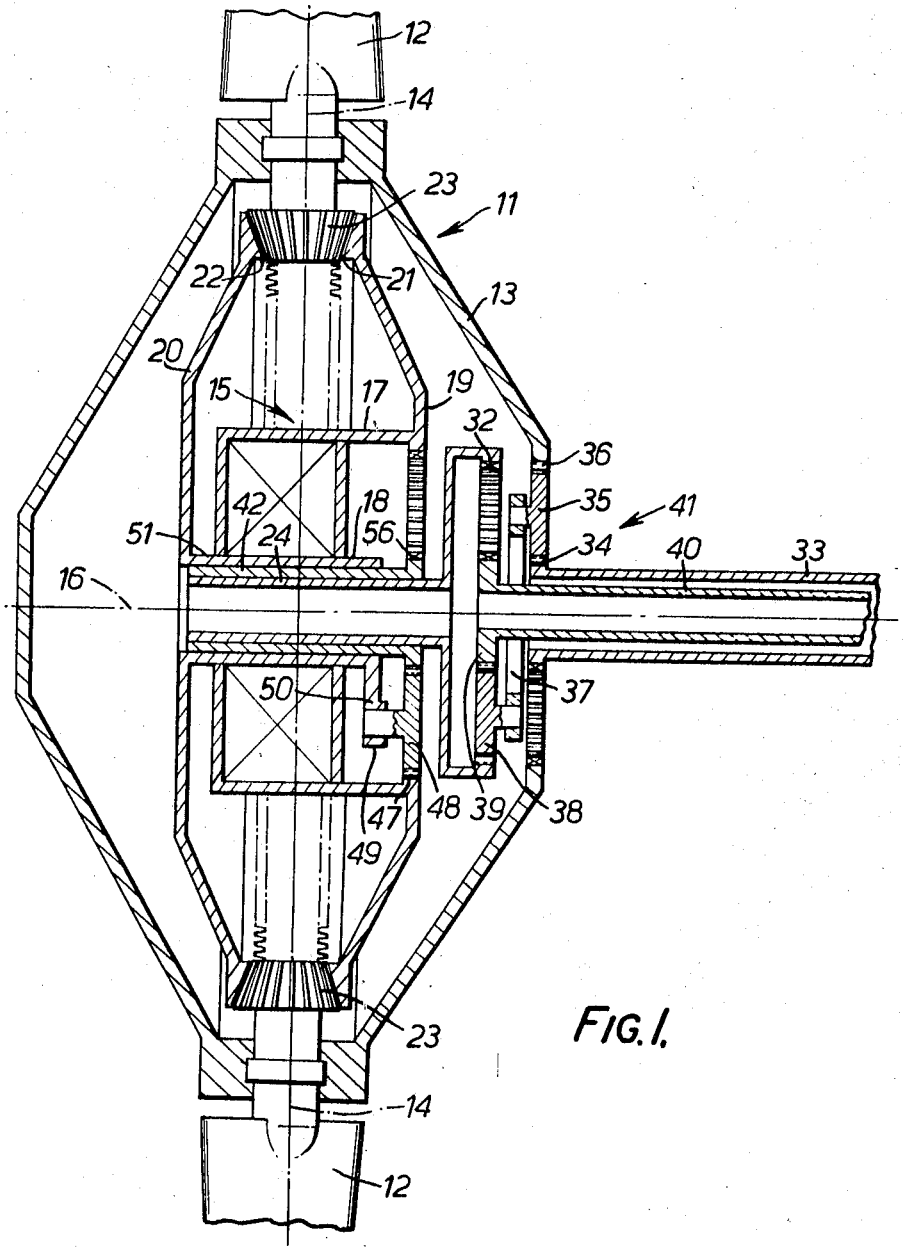

United States Patent
Chilman et al.

[15] 3,647,320
[45] Mar. 7, 1972

[54] BLADED ROTORS

[72] Inventors: John Alfred Chilman, Painswick; Ivor Harold Brooking, Wotton, both of England

[73] Assignee: Dowty Rotol Limited, Gloucester, England

[22] Filed: Apr. 7, 1970

[21] Appl. No.: 26,216

[30] Foreign Application Priority Data

Apr. 21, 1969 Great Britain.....................20,135/69

[52] U.S. Cl.................................416/157, 416/160, 91/376
[51] Int. Cl. .......................................B63h 3/02, B63h 3/08
[58] Field of Search..................416/155, 156, 157, 158, 159, 416/160, 149, 151; 91/216 A, 376

[56] References Cited

UNITED STATES PATENTS

| | | | |
|---|---|---|---|
| 2,462,932 | 3/1949 | Anderson | 416/158 |
| 2,490,509 | 12/1949 | Carleton | 91/375 |
| 2,628,684 | 2/1953 | Slatter et al | 91/375 |
| 2,745,502 | 5/1956 | Gehres | 416/157 |
| 2,954,830 | 10/1960 | Gehres | 416/157 |

FOREIGN PATENTS OR APPLICATIONS 728,851 12/1942 Germany..............................416/156

Primary Examiner—Everette A. Powell, Jr.
Assistant Examiner—Clemens Schimikowski
Attorney—Young and Thompson

[57] ABSTRACT

A bladed rotor including blading adjustable by a valve-controlled fluid-operable actuator, the actuator and valve being rotatable with the rotor hub. The valve has one element adjustable with respect to the hub and a further element cooperable with the one element to control fluid supply to the actuator. Feedback means connected between the actuator and the further element produce relative movement of the actuator and further element, during which the latter follows up movement of said one element.

10 Claims, 3 Drawing Figures

BLADED ROTORS

This invention relates to bladed rotors having blading the flow-varying characteristics of which are adjustable by a fluid-pressure operated actuator.

According to the invention a bladed rotor includes flow-varying blading, a fluid-pressure-operated actuator for adjusting the blading, a valve controlling the actuator, said actuator and said valve being rotatable with the hub of the rotor and said valve having a valve element which is adjustable with respect to the hub and a further valve element which cooperates with the adjustable valve element to control the flow of fluid supplied to the actuator, and feedback means connected between the actuator and the further valve element to produce relative movement of the actuator and further valve element during which the further valve element follows up movement of the adjustable valve element.

Although other types of blading may be used, the blading is preferably of variable pitch and will be described as such hereinafter. The adjustable valve element may be mounted for angular adjustment within the rotor hub, in which case the followup movement desirably consists of relative angular movement of the two valve elements with an adjusting member for adjusting the adjustable valve element nonrotatable with the hub but mounted for angular adjusting movement produced by control means disposed externally of the hub. The angular movements of the valve elements and of the adjusting member are desirably about the rotation axis of the rotor, and the further valve element may comprise a ported sleeve which is mounted on the adjustable valve element with the porting in the sleeve cooperating with corresponding porting in the adjustable valve element to control directly the flow of pressure fluid from the valve to the actuator.

An epicyclic gear train may be provided by which angular displacement of the adjusting member, when the latter is nonrotatable with the hub, produces corresponding angular adjustment of the adjustable valve element while the latter rotates with and at the same speed as the hub while the adjusting member remains stationary. The feedback means preferably includes gearing between the actuator and the further valve element, the ratio of this gearing being chosen to produce the desired overall range of blade-pitch adjustment for an input signal range, i.e., movement of the adjusting member, which is of significant size and conveniently available. Thus this gearing ratio can be chosen to provide the desired overall operational response, and the gearing is conveniently of epicyclic type.

The actuator is preferably of the balanced-vane type, with cooperating vane assemblies which turn in opposite directions about the rotation axis of the rotor and which adjust the pitch of the blading through a balanced drive mechanism which may, for example, be of bevel gear type. A convenient and compact construction results if the two valve elements are disposed coaxially with and within the actuator. With this arrangement and the further valve element in the form of a sleeve, as described, the sleeve may directly control the flow of pressure fluid between the porting in the adjustable valve element and suitable porting in one vane assembly within which the sleeve is mounted for angular followup movement. This arrangement is of particular advantage when applied to bladed rotors having a large multiplicity of blades, all operated in angular synchronism by the one central vane-type actuator through bevel gears. Thus the invention is of particularly suitable application to a variable-pitch bypass fan of an aircraft gas turbine engine of the bypass type.

Figure 2:
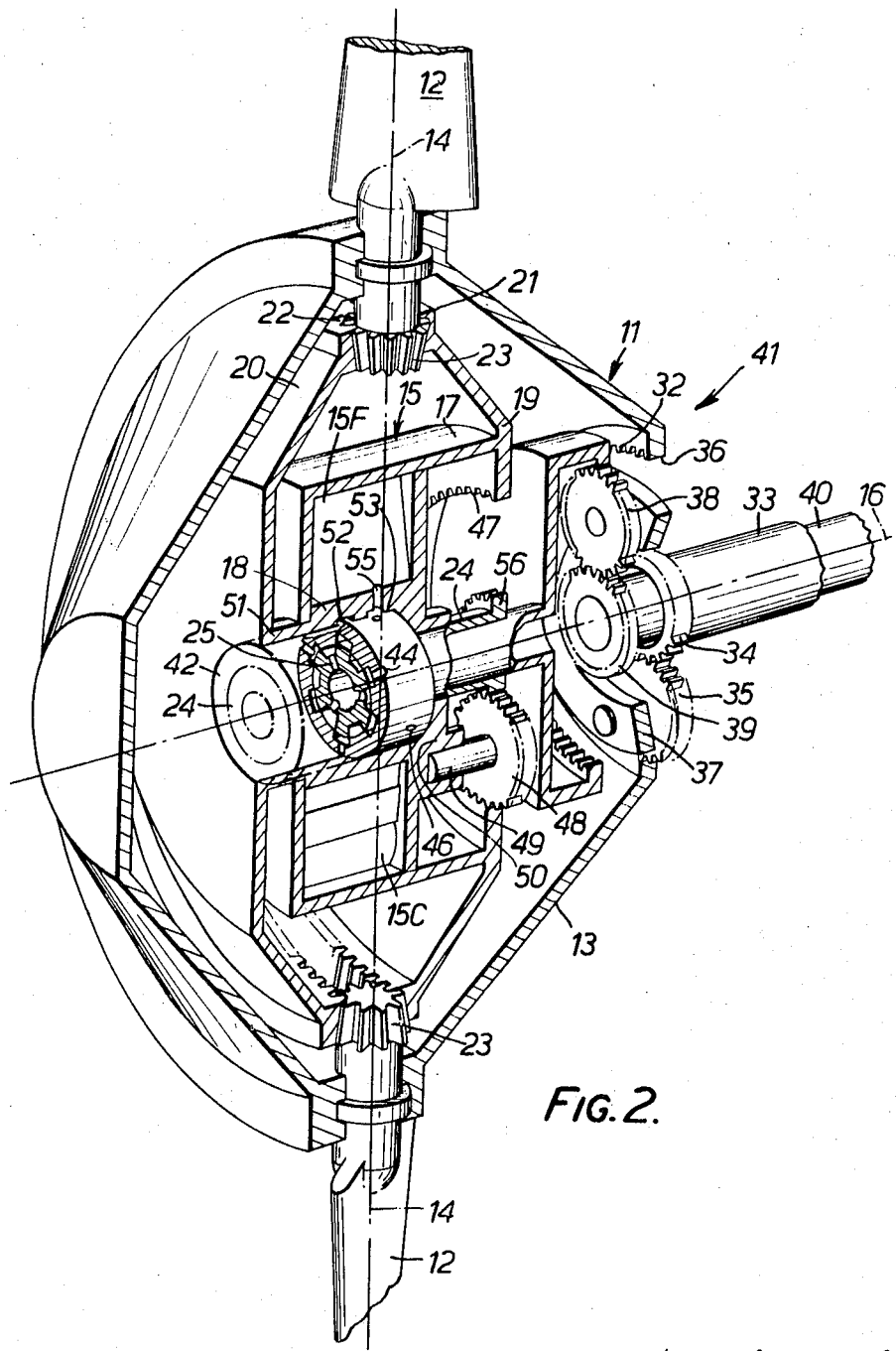
Figure 3:
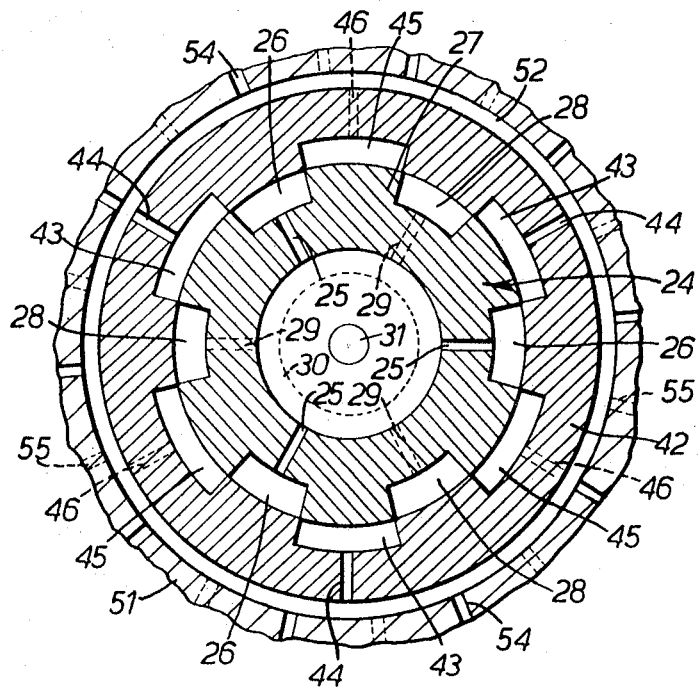

Such an embodiment of the invention is illustrated in the accompanying drawings, and will now be described by way of example with reference to those drawings, of which, FIG. 1 is a diagrammatic cross-sectional side elevation of a variable-pitch bypass fan, FIG. 2 is a partly cutaway perspective view of the bypass fan shown in FIG. 1, and, FIG. 3 is an enlarged cross section of valve elements forming part of the structure of FIGS. 1 and 2.

With reference to the drawings, a bladed rotor 11 has a large multiplicity of blades 12 each mounted in suitable manner in a hub 13 for pitch variation about a longitudinal pitch-change axis 14. In this particular embodiment there are seventeen blades mounted in the hub although only two of these blades are shown in FIGS. 1 and 2. Pitch variation of the blades is effected by the operation of a pitch-change actuator 15 of the hydraulic balanced-vane type, rotatable with the rotor and having its axis 16 coincident with the rotation axis of the rotor 11. The actuator 15 has a multiplicity of chambers, in this particular embodiment twenty, formed by a first multivaned assembly or actuator part 17 and a second multivaned assembly or actuator part 18. Two such chambers are shown in part in FIG. 2, one a coarse pitch chamber at 15C and the other a fine pitch chamber at 15F. Portions 19 and 20 of the parts 17 and 18 carry respective bevel gear rings 21 and 22 which mesh with bevel gears 23, one fast with the root portion of each blade 12. As shown, the points of meshing of the bevel gear rings 21 and 22 with each bevel gear 23 are substantially diametrically opposed upon the latter. A bladed rotor having such an actuator is disclosed in the specification of U.S. application Ser. No. 873,464.

The actuator 15 is operable under the control of an hydraulic valve rotatable with the rotor and having an angularly-adjustable valve element 24. This element is of tubular form having two sets of three radially directed ports axially spaced along the element. The ports of the first set are shown in FIGS. 2 and 3 at 25. FIG. 3 is a section taken through the hydraulic valve in the plane of these ports, the ports placing the hollow interior of the element in communication with respective longitudinal channels 26 formed between longitudinal lands 27 provided upon the element. Further longitudinal channels 28, alternating with the channels 26, are formed between the lands 27, and these channels 28 are in communication through the radially directed ports of the second set, shown in dotted detail at 29, with a drain duct 30 arranged within the hollow interior of the element 24.

The axis of the element 24 is coincident with the axis 16 and a feed conduit 31 whose axis is also coincident therewith is provided for conducting liquid under pressure derived from the engine to the hollow interior of the element 24. The drain duct 30 is taken back, in coaxial manner with respect to the conduit 31, to the engine. A suitable liquid transfer muff (not shown) is provided for both the feed conduit and the drain duct between nonrotatable and rotatable portions thereof.

A valve element adjusting or input member 33, coaxially arranged with respect to the valve element 24, is angularly adjustable about the axis 16 and with respect to the hub by a pitch control member of external control means (not shown). The member 33 carries a sun gear 34 which meshes with three planet gears, one of which is shown at 35. The planet gears 35 mesh with an annulus gear 36 carried by the hub 13, and are carried upon the right-hand side in FIGS. 1 and 2 of a planet carrier 37, while three further planet gears, one of which is shown at 38, are carried upon the left-hand side of the planet carrier 37. The three gears 38 mesh with a fixed sun gear 39 having a shaft 40 which is suitably earthed, i.e., externally held, so as to be nonrotatable. The three planet gears 38 also mesh with the annulus gear 32 carried by the valve element 24.

The epicyclic train 41 thus formed by the above-described gearing provides a transmission mechanism which ensures that when, during rotation of the bladed rotor 11, the input member 33 is angularly adjusted about the axis 16, a corresponding angular adjustment of the valve element 24 about the axis 16 occurs.

The arrangement also includes feedback means associated with the actuator to a further valve element in the form of a sleeve 42 which surrounds and is directly cooperable with the valve element 24. The sleeve is provided with six longitudinally extending radially inwardly facing channels, three of which, shown at 43, have radially directed ports 44 connected to them, and the other three of which, shown at 45, have radially directed ports 46 connected to them. The sets of ports 44 and 46 are respectively referred to hereinafter as coarse pitch ports and fine pitch ports because they are respectively concerned with the direction of pressure liquid to the coarse pitch and fine pitch sides of the pitch-change actuator 15. The sets of ports 44 and 46 respectively lie in the same planes as the sets of ports 25 and 29 and thus are axially spaced along the sleeve 42.

When the valve element 24 and the sleeve 42 are in neutral as shown in FIGS. 2 and 3, the lands 27 align exactly with the channels 43 and 45 to close the channels 26 from those channels.

The feedback means also includes a ring of internal gear teeth 47, formed on the portion 19 of the actuator part 17, which mesh with a gear 48 mounted for rotation at 49 in an upstanding flange 50 carried by the tubular portion 51 of the actuator part 18. This portion has two axially spaced annuli 52 and 53 formed on its inner surface, the annulus 52 being in the plane of the coarse pitch ports 44 and the annulus 53 being in the plane of the fine pitch ports 46.

Ten coarse pitch ports 54 formed in the tubular portion 51 respectively connect the annulus 52 to the ten coarse pitch chambers 15C, while ten fine pitch ports 55 respectively connect the annulus 53 to the ten fine pitch chambers 15F.

During operation of an engine to which the rotor is fitted, the pitch of the blades 12 is set at a value dependent upon the setting of the pitch control member which is typically a pitch control lever operated by the aircraft pilot. If the pilot wishes to change the pitch of the blades, for example in the pitch-fining sense in order to reduce the speed of the fan on approach and so to reduce fan noise in the vicinity of airports, he operates the pitch control lever in the pitch-fining direction and consequent angular adjustment of the input member 33 occurs. The epicyclic gear train 41 is then operative to transmit a corresponding angular movement to the annular gear 32 and to the valve element 24.

Such movement of the valve element which is away from the neutral position shown in FIGS. 2 and 3 and in the clockwise direction when viewed in FIG. 3, causes the three channels 26 to be opened to the three channels 45 and thus the ports 46, annulus 53, and ports 55, so that pressure liquid available in the feed conduit 31 and the ports 25 passes to the ten fine pitch chambers 15F of the actuator 15. Simultaneously, the three channels 28 are opened to the three channels 43 so that liquid from the ten coarse pitch chambers 15C can exhaust to the drain duct 30 through the ports 54, annulus 52, ports 44, channels 43, channels 28 and ports 29. This results in both parts 17 and 18 of the actuator 15 being angularly adjusted equally in opposite directions, and the turning moments applied to each blade 12 through the teeth 21 and 22 in the pitch-fining direction are equal and additive about the axis 14. However, since these moments are applied at positions substantially opposite each other upon each blade root portion, a balance is achieved in the journal loading of the respective blade root bearing.

The bevel gearing 21, 22, 23 affords a substantial step-up ratio whereby small angular movements of the parts 17 and 18 about the axis 16 results in much larger angular movements of the blades 12 about their pitch-change axes 14. As the blades reach the setting demanded by the new position of the pitch control lever, the feedback means is operative angularly to adjust the sleeve 42 about the axis 16 so that the channels 43 and 45 come into exact alignment with the lands 27 thus to close off communication of the channels 26 with the channels 45 and thus to close off communication of the channels 28 with the channels 43. Thus with the valve element and sleeve back in their neutral position the actuator 15 and the blades 12 are hydraulically held in their new settings.

In describing the manner in which feedback is applied to the sleeve 42, it will be understood that since during the pitch-changing movement both parts 17 and 18 of the actuator 15 move equally and oppositely, the tubular portion 51 and the ring 47 of gear teeth move oppositely and through equal angles about the axis 16. Hence, the ring 47 of gearteeth rotates the gear 48 about its axis in one direction but the arcuate movement applied by the flange 50 to the gear 48 in the circumferential sense about the axis 16 is subtractive upon the movement imposed on the gear 48 by the ring 47. Since the radius of the arc along which the center of the gear 48 moves is less than the effective radius of the ring 47 of teeth, then for equal angular movements of the parts 17 and 18 of the actuator 15, the arcuate movement of the flange 50 is less than the arcuate movement of the ring 47 of teeth. Hence, during such followup a resultant rotational movement of the gear 48 occurs about its axis of rotation, and since this gear meshes with a gear 56 fast upon the sleeve 42, the sleeve is rotated through an angle corresponding to the actuator displacement thereby effectively bringing the valve element and sleeve back to the neutral condition as the selected blade setting is reached.

If, conversely, it is desired to coarsen the pitch of the blades 12, the pitch control level is moved in the opposite direction, as is the input member 33, so that the valve element 24 is moved away from neutral in an anticlockwise direction when viewed in FIG. 3, whereupon the channels 26 are opened to the channels 43 and thus liquid under pressure passes through the ports 44, annulus 52 and ports 54 to the ten coarse pitch chambers 15C. Simultaneously, the ten fine pitch chambers 15F are placed in communication with the drain duct 30 through the ports 46, the channels 45, 28, and the ports 29, the actuator thereby operating to coarsen the pitch of the blades 12.

The pitch-change arrangement of the blading is such that the blading can be moved into reverse pitch when required for reverse thrust operation of the bladed rotor, and the gear ratio in the feedback means is chosen to give the required gain to the system.

The invention is not limited in its application to fans for gas turbine engines of the bypass type, as in other embodiments it is applied to other types of fan, propellers and the like.

Further, the invention is not limited to the provision of a hydraulic valve of the kind described in the illustrated embodiment, or to manually initiated control of the actuator, as in other embodiments different forms of valve can be used. Moreover, the actuator may be controlled by a speed-responsive governor.

Further, although in the illustrated embodiment the actuator is hydraulically operable, in other embodiments it is pneumatically operable.

We claim

1. A bladed rotor including a hub, flow-varying blading mounted in the hub, a fluid-pressure-operated actuator of balanced type for adjusting the blading, said actuator comprising cooperating assemblies which move in opposite directions and a balanced drive mechanism through which the assemblies adjust the blading, a valve controlling the actuator comprising an adjustable valve element and a further valve element which cooperates with the adjustable valve element and has porting which controls flow between porting in the adjustable valve element and the actuator, the adjustable valve element and the further valve element being coaxially arranged within the hub, and feedback means connected between the actuator and the further valve element to produce relative movement of the actuator and further valve element during which the further valve element follows up movement of the adjustable valve element, said feedback means comprising differential gearing which includes a first member on one of said assemblies, a second member associated with and driving the further valve element and at least one intermediate member cooperable with said first and second members and mounted on the other of said assemblies.

2. A bladed rotor as claimed in claim 1, wherein an adjusting member is provided for adjusting the adjustable valve element, said adjusting member being nonrotatable with the hub and being mounted for angular adjusting movement produced by control means disposed externally of the hub.

3. A bladed rotor as claimed in claim 2, wherein the angular movements of the valve elements and of the adjusting member are about the rotation axis of the rotor.

4. A bladed rotor as claimed in claim 2, wherein an epicyclic gear train is provided by which angular displacement of the adjusting member produces corresponding angular adjustment of the adjustable valve element while the latter rotates with and at the same speed as the hub while the adjusting member remains stationary.

5. A bladed rotor as claimed in claim 1, wherein the balanced drive mechanism is of bevel gear type.

6. A bladed rotor as claimed in claim 1, wherein said rotor has a large multiplicity of blades.

7. A bladed rotor as claimed in claim 6, wherein said large multiplicity of blades are all operated in angular synchronism by one central vane-type actuator through bevel gears.

8. A bladed rotor including a hub, variable-pitch blading mounted in the hub, a fluid-pressure-operated actuator of balanced vane type for adjusting the blading, said actuator comprising cooperating vane assemblies which turn in opposite directions about the rotation axis of the rotor and a balanced drive mechanism through which the assemblies adjust the pitch of the blading, a valve controlling the actuator comprising an adjustable valve element and a further valve element which cooperates with the adjustable valve element and has porting which controls flow between porting in the adjustable valve element and the actuator, the adjustable valve element and the further valve element being coaxially arranged within the hub, and feedback means connected between the actuator and the further valve element to produce relative movement of the actuator and further valve element during which the further valve element follows up movement of the adjustable valve element, said feedback means comprising an epicyclic gear train including an outer ring gear on one of said vane assemblies, a sun gear associated with and driving the further valve element and at least one planet pinion in mesh with the ring and sun gears and mounted on the other of said vane assemblies.

9. A bladed rotor according to claim 8, wherein said sun gear of the epicyclic gear train is rotatably fixed with respect to the further valve element and movement of both valve elements is entirely rotational about said rotation axis.

10. A bladed rotor according to claim 8, wherein said further valve element is a sleeve valve element which surrounds the adjustable valve element.

* * * * *